United States Patent [19]

Takahashi

[11] Patent Number: 5,359,429
[45] Date of Patent: Oct. 25, 1994

[54] FACSIMILE MACHINE HAVING LINE DENSITY SWITCHING FUNCTION

[75] Inventor: Yoshiaki Takahashi, Tokyo, Japan
[73] Assignee: Fujitsu Limited, Japan
[21] Appl. No.: 820,909
[22] PCT Filed: May 20, 1991
[86] PCT No.: PCT/JP91/00669
§371 Date: Mar. 5, 1992
§102(e) Date: Mar. 5, 1992
[87] PCT Pub. No.: WO91/18469
PCT Pub. Date: Nov. 28, 1991

[30] Foreign Application Priority Data

May 22, 1990 [JP] Japan .................. 2-131543

[51] Int. Cl.$^5$ .................. H04N 1/32; H04N 1/40
[52] U.S. Cl. .................. 358/439; 358/404; 358/426
[58] Field of Search .............. 358/261.1, 261.2, 261.4, 358/296, 426, 427, 434, 439, 444, 448, 468, 436, 404; 382/56; 395/115, 116

[56] References Cited

U.S. PATENT DOCUMENTS

| | | | |
|---|---|---|---|
| 4,712,139 | 12/1987 | Kato | 358/434 |
| 5,206,741 | 4/1993 | Shimura et al. | 358/404 |
| 5,220,437 | 6/1993 | Saegusa et al. | 358/404 |

FOREIGN PATENT DOCUMENTS

| | | | |
|---|---|---|---|
| 56-57363 | 5/1981 | Japan | H04N 1/41 |
| 58-106954 | 6/1983 | Japan | H04N 1/32 |
| 59-99873 | 6/1984 | Japan | H04N 1/40 |
| 60-58753 | 4/1985 | Japan | H04M 1/64 |
| 60-93877 | 5/1985 | Japan | H04N 1/40 |
| 60-152175 | 8/1985 | Japan | H04N 1/40 |
| 62-208758 | 9/1987 | Japan | H04N 1/21 |
| 62-227268 | 10/1987 | Japan | H04N 1/32 |

Primary Examiner—Benjamin R. Fuller
Assistant Examiner—Eric Frahm
Attorney, Agent, or Firm—Greer, Burns & Crain, Ltd.

[57] ABSTRACT

A facsimile machine having a memory reception mode in which image data received from a transmitting facsimile machine during an automatic reception is temporarily stored in a memory, and is provided with a detecting part for detecting a remaining memory region which is usable within the memory. The invention includes a line density switching part for instructing switching of the line density if the remaining memory region detected by the detecting part is less than or equal to a predetermined region, and a control part for making a capability notification to the transmitting facsimile machine in a pre-procedure during the automatic reception. The control part automatically transmits the capability notification again to the transmitting facsimile machine in response to the instruction from the line density switching part so as to receive the image data from the transmitting facsimile machine with a line density which is lower than an initial line density at the time when the automatic reception is started.

5 Claims, 8 Drawing Sheets

FACSIMILE MACHINE HAVING LINE DENSITY SWITCHING FUNCTION

TECHNICAL FIELD

The present invention generally relates to facsimile machines, and more particularly to a facsimile machine which controls an image data quantity to be stored in a memory by switching the line density when a remaining memory region is small at the time of a reception.

BACKGROUND ART

Recently, in facsimile machines, a memory transmission (store-and-forward) technique is popularly used. According to the memory transmission techniques, image data related to a document which is read is compressed and temporarily stored in a memory, and the image data which is read out from the memory depending on the reception capability of the destination facsimile machine is compressed again and transmitted. The memory is also used in a memory reception to store the received image data in an available memory region when the paper runs out during an automatic reception, for example.

According to the conventional memory reception, the line density is set to 15.4 lines/mm, 7.7 lines/mm, 3.85 lines/mm and the like from a panel on the transmitting facsimile machine. At the receiving facsimile machine, a predetermined line density is applied to all pages of the received document if the predetermined line density is set during an initial procedure of the automatic reception. Conventionally, there exists no procedure for changing the predetermined line density which is set during the reception of the document.

Figure 1:
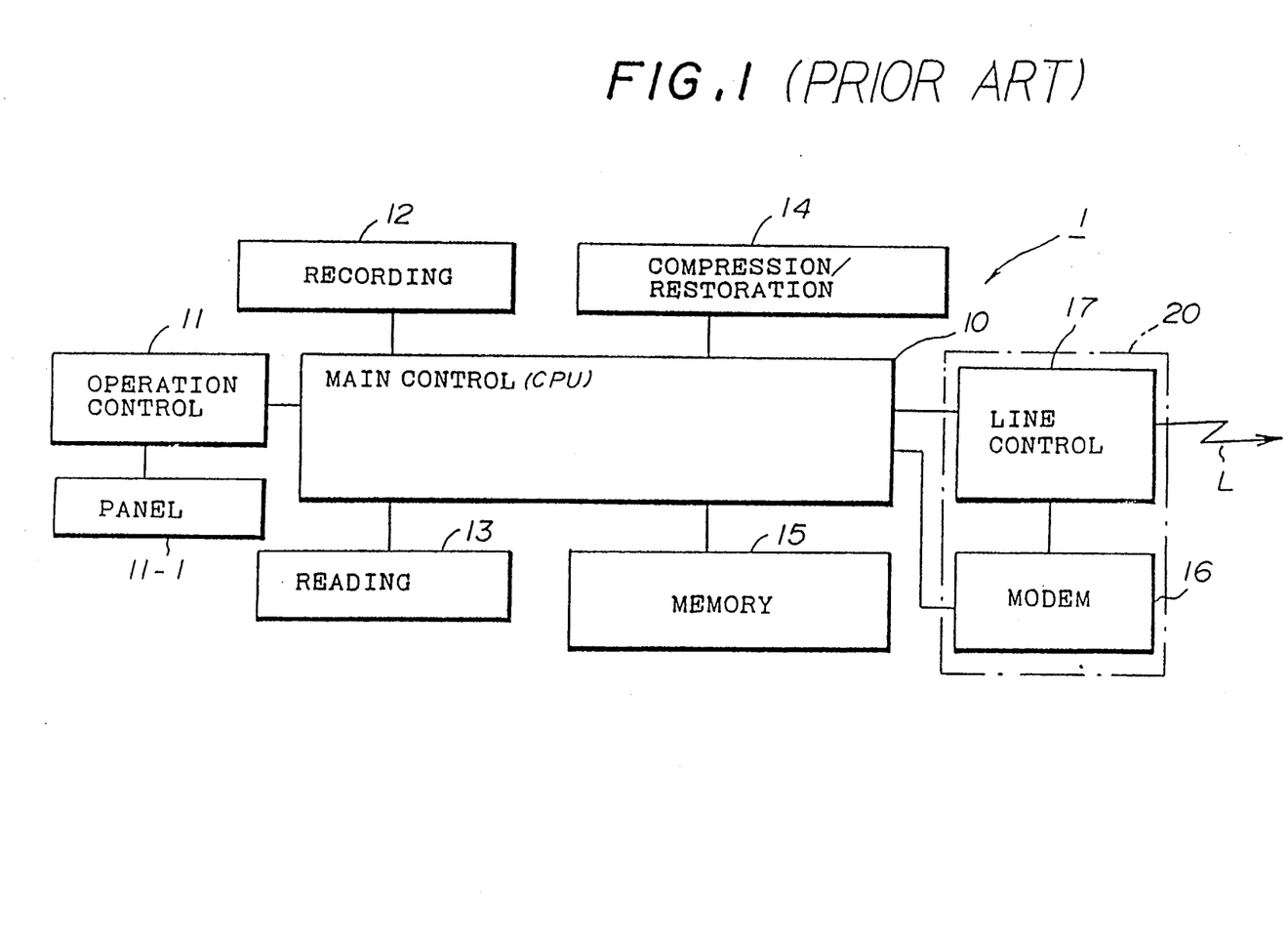
FIG. 1 is a system block diagram showing an example of a conventional facsimile machine.
Figure 2:
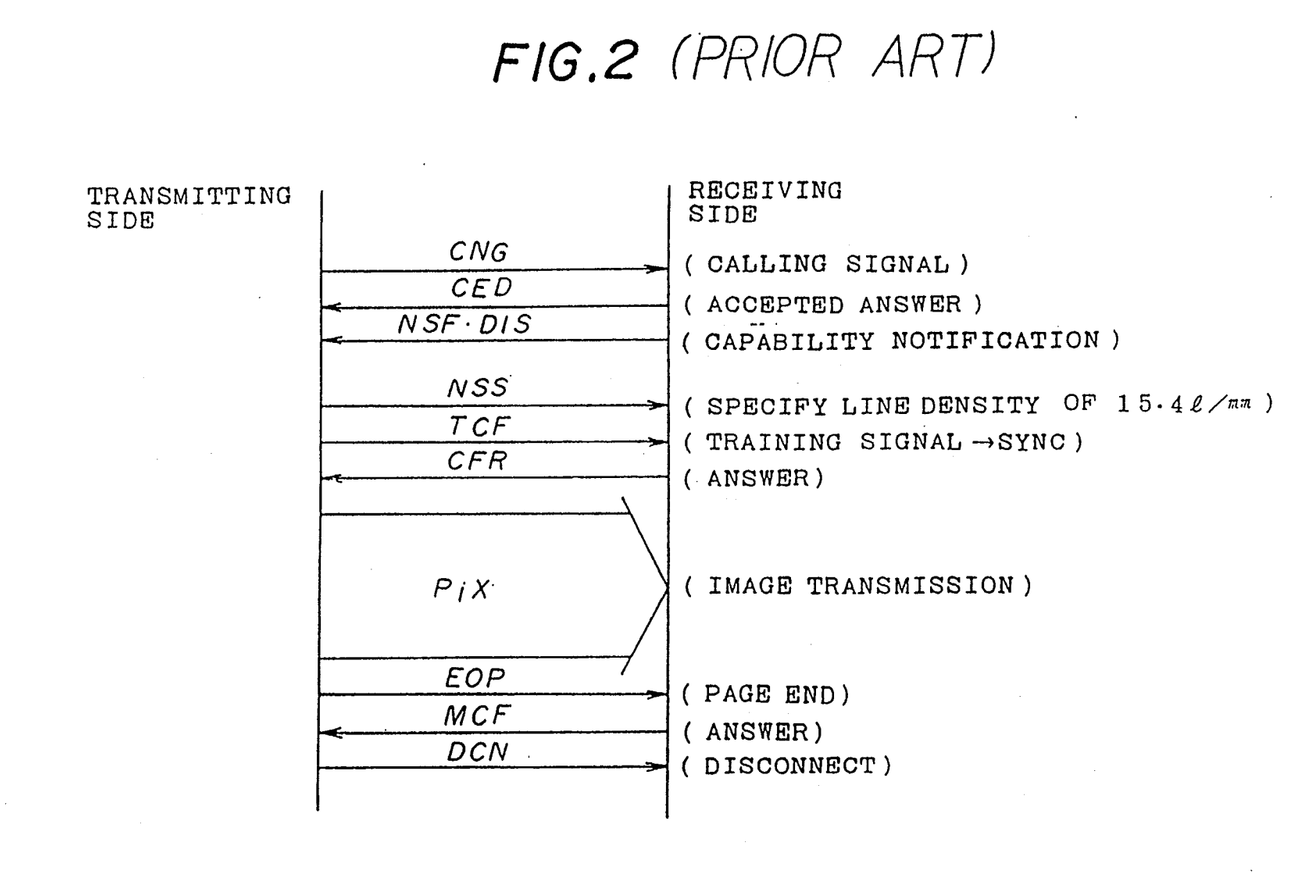
FIG. 2 is a sequence diagram for explaining the operation of the conventional facsimile machine.

Next, a description will be given of an example of a conventional facsimile machine, by referring to FIGS. 1 and 2. FIG. 1 shows a conventional facsimile machine 1, and FIG. 2 shows an operation sequence of the facsimile machine 1.

In FIG. 1, the facsimile machine 1 generally includes a main control part (CPU) 10, an operation control part 11, a recording part 12, a reading part 13, a compression/restoration part 14, a memory 15, and a communication control part 20. An operation panel 11-1 is connected to the operation control part 11, and the communication control part 20 is made up of a modem 16 and a line control part 17.

Under the control of the main control part 10, each function such as the line density is set from the operation panel 11-1 which is connected to the operation control part 11. In addition, the dialing of the destination number is made from the ten-key, a one-touch key or the like of the operation panel 11-1. When the line is connected, the pre-procedure shown in FIG. 2 is started when the destination facsimile machine has the automatic reception function.

On the other hand, the reading part 13 optically reads the inserted document and outputs the image data related to the read document. This image data is coded in the compression/restoration part 14 according to the modified Huffman (MH) coding, for example, under the control of the main control part 10, and is thereafter stored temporarily in the memory 15.

When the transmission mode is set in the modem 16 within the communication control part 20 by the pre-procedure, the image data is read out from the memory 15 under the control of the main control part 10. The read out image data is restored in the compression/restoration part 14 before being compressed again depending on the transmission mode. The image data which is compressed again is modulated in the modem 16 and is transmitted to a line L via the line control part 17.

The image data which is received from the line L is supplied to the modem 16 via the line control part 17 and is demodulated in the modem 16. The demodulated image data is temporarily stored in the memory 15 in the compressed form under the control of the main control part 10 or, is restored in the compression/restoration part 14 and printed on a recording paper by the recording part 12.

In FIG. 2, the destination number is dialed from the transmitting facsimile machine (hereinafter simply referred to as the transmitting side) and a calling signal (CNG) is transmitted to the receiving facsimile machine (hereinafter simply referred to as the receiving side). An accepted answer (CED) is returned from the receiving side, and the capability notification of the facsimile pre-procedure is made by notifying signals (NSF, DIS). In other words, the notification of capabilities such as the transmission speed (for example, 9600 bps, 4800 bps, 2400 bps) of the receiving side is made, and the transmitting side specifies the line density to 15.4 lines/mm, for example, by a transmission command (NSS), and at the same time, transmits a synchronizing training signal (TDF). If an answer (CFR) is received from the receiving side in response to the above, the transmitting side transmits the image (Pix) with the specified line density of 15.4 lines/mm. After an end of procedure (EOP) indicating the end of transmission of all of the pages is transmitted from the transmitting side, the transmitting side confirms an answer (MCF) from the receiving side and transmits a disconnect request (DCN).

Therefore, according to the conventional facsimile machine, the same line density is applied during the pre-procedure before the transmission of the image data and also during the after-procedure, and the line density cannot be switched during the procedure.

For example, when the receiving side starts the automatic reception or the paper runs out during the automatic reception, the operation mode is automatically switched to the memory reception mode. However, particularly in the case of a compact type facsimile machine, the memory capacity is set relatively small in order to reduce the cost of the machine. For this reason, there are problems in that the quantity of data the image data which is received may exceed the memory capacity and the memory reception of all of the image data may not be possible. Particularly when the line density is set to a large density such as 15.4 lines/mm from the transmitting side, the image data quantity is large and the possibility of the data quantity exceeding the memory capacity is high. In addition, the amount of paper which may be accommodated within the compact type facsimile machine is limited, and the compact type facsimile machine runs out of paper more frequently compared to the facsimile machines of larger sizes.

SUMMARY OF THE INVENTION

Accordingly, it is a general object of the present invention to provide a novel and useful facsimile machine in which the problems described above are eliminated.

Another and more specific object of the present invention is to provide a facsimile machine having a memory reception mode in which image data received from a transmitting facsimile machine during an automatic reception is temporarily stored in memory means (15), including detecting means coupled to the memory means, for detecting a remaining memory region which is usable within the memory means line density switching means for instructing switching of the line density if the remaining memory region detected by the detecting means is less than or equal to a predetermined region, and control means for making a capability notification to the transmitting facsimile machine in a pre-procedure during the automatic reception, where the control means automatically transmits the capability notification again to the transmitting facsimile machine in response to the instruction from the line density switching means so as to receive the image data from the transmitting facsimile machine with a line density which is lower than an initial line density at the time when the automatic reception is started. According to the facsimile machine of the present invention, the capability notification is again automatically transmitted and the line density is switched to a value lower than the initial line density when the remaining memory region becomes small and the possibility of the remaining memory region becoming zero during the memory reception becomes high. For this reason, when the present invention is applied to a facsimile machine which frequently makes automatic receptions at night when no person can the machine and frequency makes memory receptions because of the relatively small amount of paper the machine can accommodate, it is possible to minimize the possibility of the remaining memory region becoming zero during the memory reception. Thus, the image data from the transmitting side can be received by the memory reception while minimizing the possibility of data loss.

Other objects and further features of the present invention will be apparent from the following detailed description when read in conjunction with the accompanying drawings.

DETAILED DESCRIPTION

Figure 3:
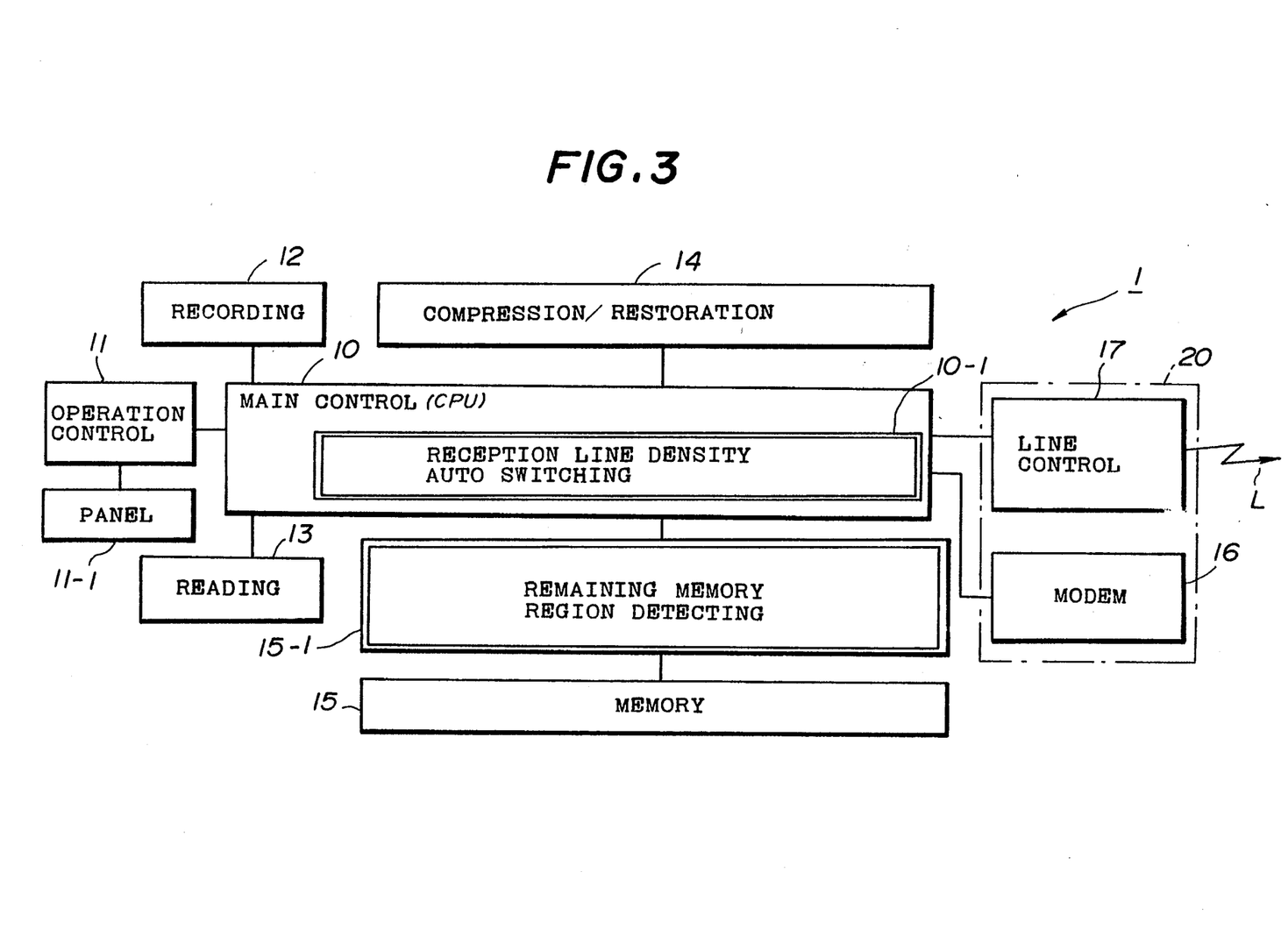
FIG. 3 is a system block diagram showing a first embodiment of a facsimile machine according to the present invention.

FIG. 3 shows a first embodiment of a facsimile machine according to the present invention. In FIG. 3, those parts which are the same as those corresponding parts in FIG. 1 are designated by the same reference numerals, and a description thereof will be omitted. In this embodiment, the main control part (CPU) 10 includes a reception line density automatic switching part 10-1, and the memory 15 coupled to the main control part 10 through a remaining memory region detecting part 15-1.

The remaining memory region detecting part 15-1 calculates the unused region of the usable memory space of the memory 15 based on the memory address. As an alternative, a predetermined access region may be set in advance, and a flag may be set to indicate that the remaining memory region has become small if the access with respect to the memory 15 is made exceeding the predetermined access region. Of course, the method of detecting the remaining memory region is not limited to the above methods.

If the remaining memory region detecting part 15-1 detects that the remaining memory region is small, the reception line density automatic switching part 10-1 waits for the present page to end, resets the capability notification by the pre-procedure again and switches the line density to the minimum line density. As a result, the minimum line density is specified from the transmitting side to the receiving side, and the receiving side performs the memory reception with the minimum line density starting from the next page. Therefore, it is possible to store in the remaining memory region of the memory 15 a number of pages which is several times greater than the number of pages which could have been received by the memory reception before the switching of the line density occurred.

Figure 4:
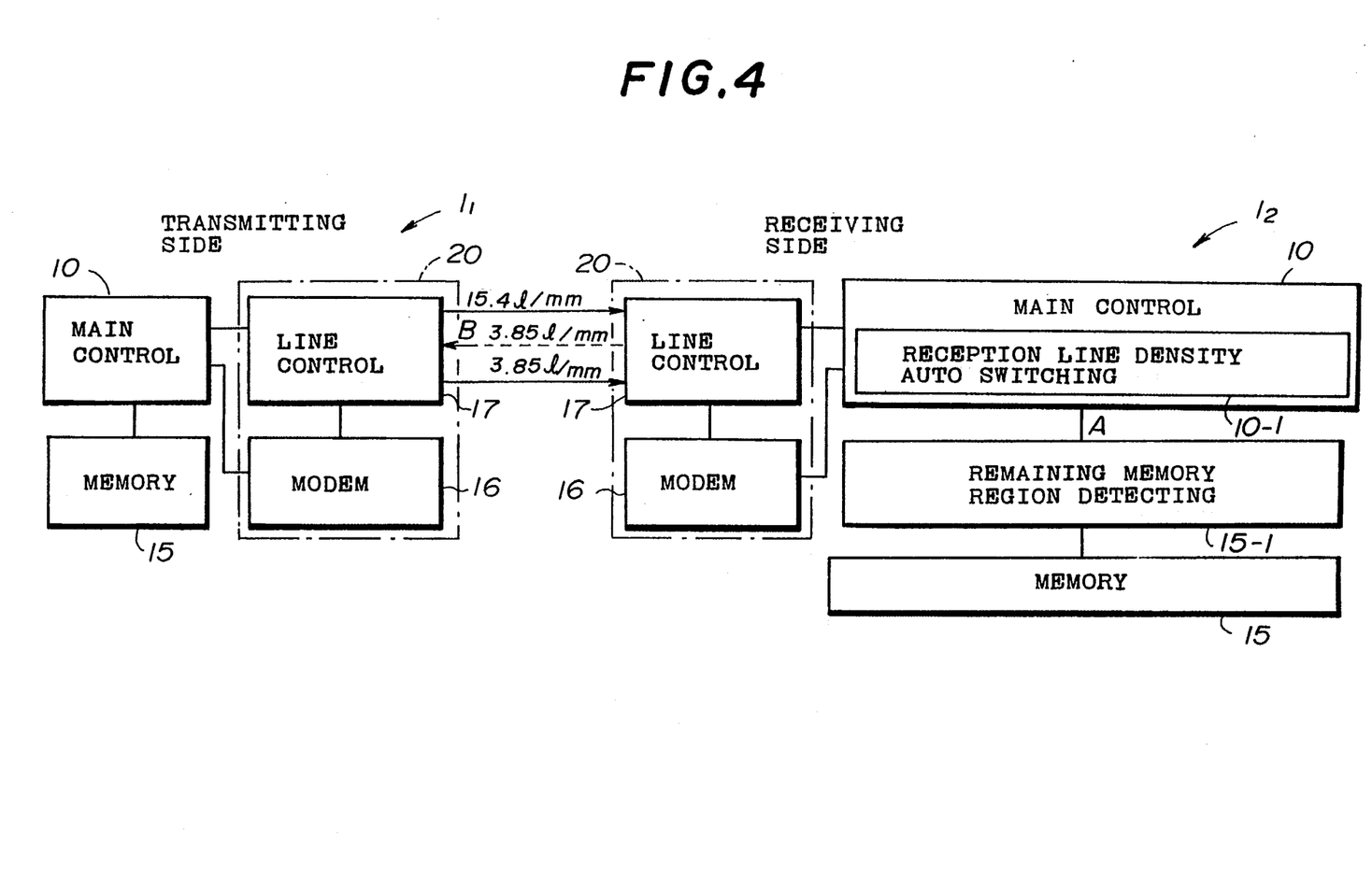
FIG. 4 is a system block diagram for explaining the operation of the first embodiment.

FIG. 4 is a system block diagram for explaining the operation of the first embodiment, and shows an essential part of a transmitting facsimile machine $1_1$ and a receiving facsimile machine $1_2$. In FIG. 4, those parts which are the same as those corresponding parts in FIG. 3 are designated by the same reference numerals, and a description thereof will be omitted.

During the memory reception of the receiving facsimile machine $1_2$, a signal A is supplied to the main control part 10 when the remaining memory region detecting part 15-1 detects that the remaining memory region is small. The reception line density automatic switching part 10-1 switches the line density to the minimum line density in response to the signal A, and notifies the reset capability to the transmitting facsimile machine $1_1$ by a signal B. The transmitting facsimile machine $1_1$ switches the line density from the initial 15.4 lines/mm, for example, to 3.85 lines/mm in response to a signal B. Hence, the receiving facsimile machine $1_2$ performs the memory reception using the memory 15 with the line density of 3.85 lines/mm. Starting from the next page, the memory 15 can store a number of pages which is four times greater than before, for example, with respect to the remaining memory region.

Figure 5:
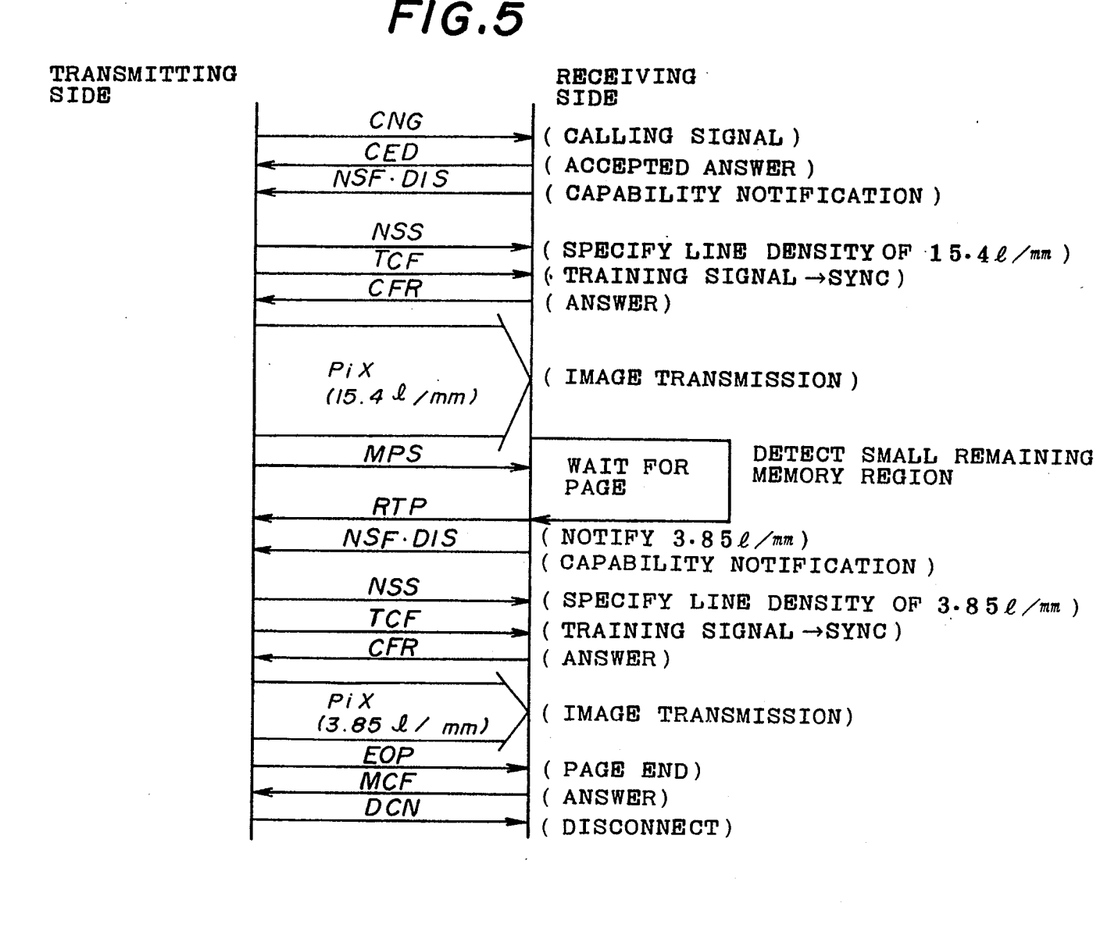
FIG. 5 is a sequence diagram for explaining the operation of the first embodiment.

FIG. 5 shows a sequence diagram of the first embodiment. In FIG. 5, those parts which are the same as those corresponding parts in FIG. 2 are designated by the same reference numerals, and a description thereof will be omitted.

In FIG. 5, the procedure is the same as the conventional procedure shown in FIG. 2 up to the point where the image (Pix) is transmitted to the receiving side with the line density of 15.4 lines/mm. Thereafter, if it is detected that the remaining memory region corresponds to only 2 pages although 5 more pages of the document are yet to be transmitted, for example, notification (NSF, DIS) of the resetting of the capability is made by a procedure (MPS) after receiving the page which is currently being received by the memory reception. For example, the line density is switched from 15.4 lines/mm to 3.85 lines/mm and the capability notification is performed with respect to the transmitting side. At the transmitting side, 3.85 lines/mm is specified similarly to a transmission command (NSS) of the pre-procedure based on the new capability notification. Synchronism is achieved by a training signal (TCF), and the remaining image (Pix) is transmitted from the transmitting side with the line density of 3.85 lines/mm if an answer (CFR) is received from the receiving side. Thereafter, the reception ends similarly as in the case of the after-procedure (EOP, MCF, DCN) of the conventional procedure. In this example, the remaining memory region amounts to 2 pages before the switching of the line density, but the remaining memory region after the switching of the line density becomes 8 pages which is sufficient to cover the 5 additional pages which are to be received.

Figure 6:
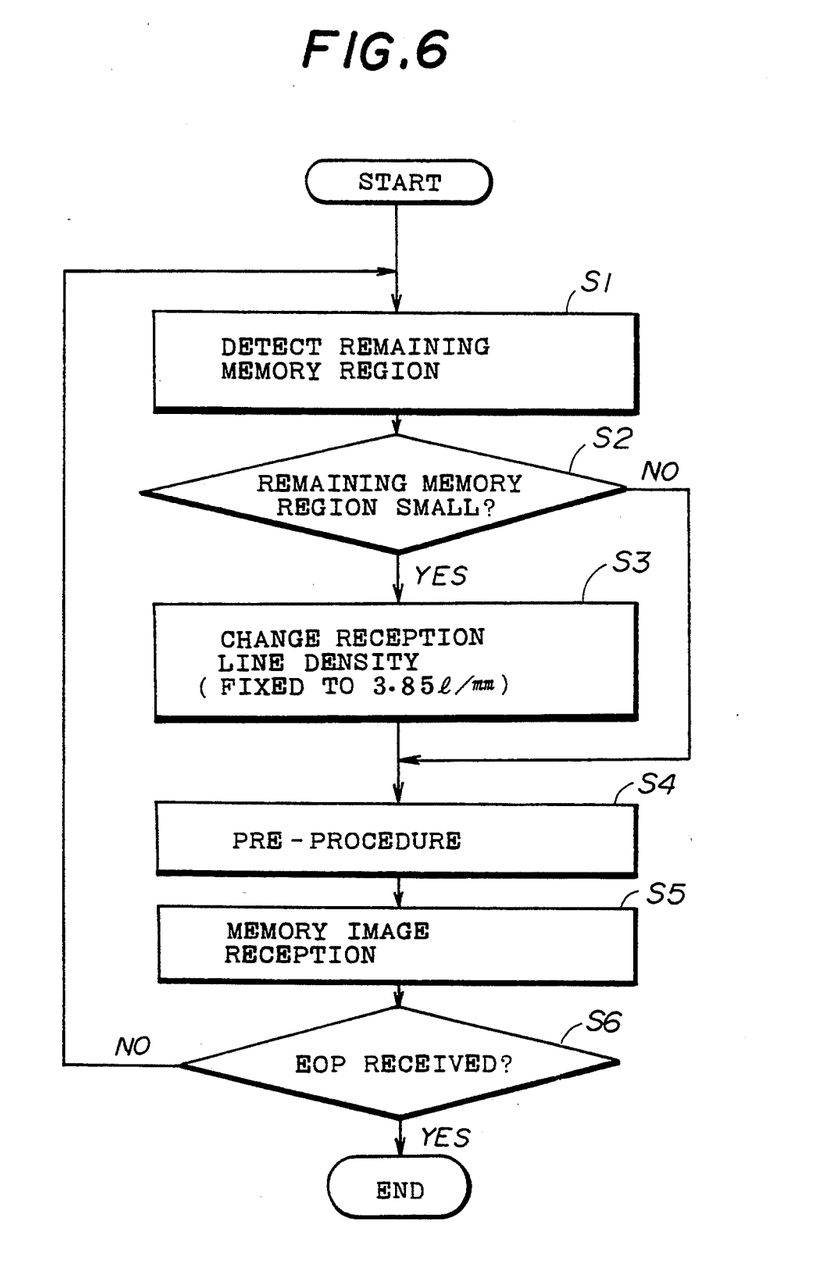
FIG. 6 is a flow chart for explaining the operation of the first embodiment.

FIG. 6 is a flow chart for explaining the operation of the first embodiment. When the memory reception starts, a step S1 detects the remaining memory region by the remaining memory region detecting part 15-1. A step S2 detects by the reception line density automatic switching part 10-1 whether or not the remaining memory region which is detected is smaller than a predetermined region. For example, if it is detected that the remaining memory region amounts to only 2 pages with 15.4 lines/mm, the decision result in the step S2 becomes YES, and a step S3 switches the line density from 15.4 lines/mm to 3.85 lines/mm, by the reception line density automatic switching part 10-1, and makes the capability notification with respect to the transmitting side.

If the decision result in the step S2 is NO or, after the step S3, a step S4 carries out the pre-procedure at the transmitting side which is in accordance with the capability notification from the receiving side, and a step S5 performs the memory reception at the receiving side. A step S6 detects whether or not the end of all pages (EOP) is received at the receiving side. The process returns to the step S1 if the decision result in the step S6 is NO, and the memory reception process ends if the decision result in the step S6 is YES.

Figure 7:
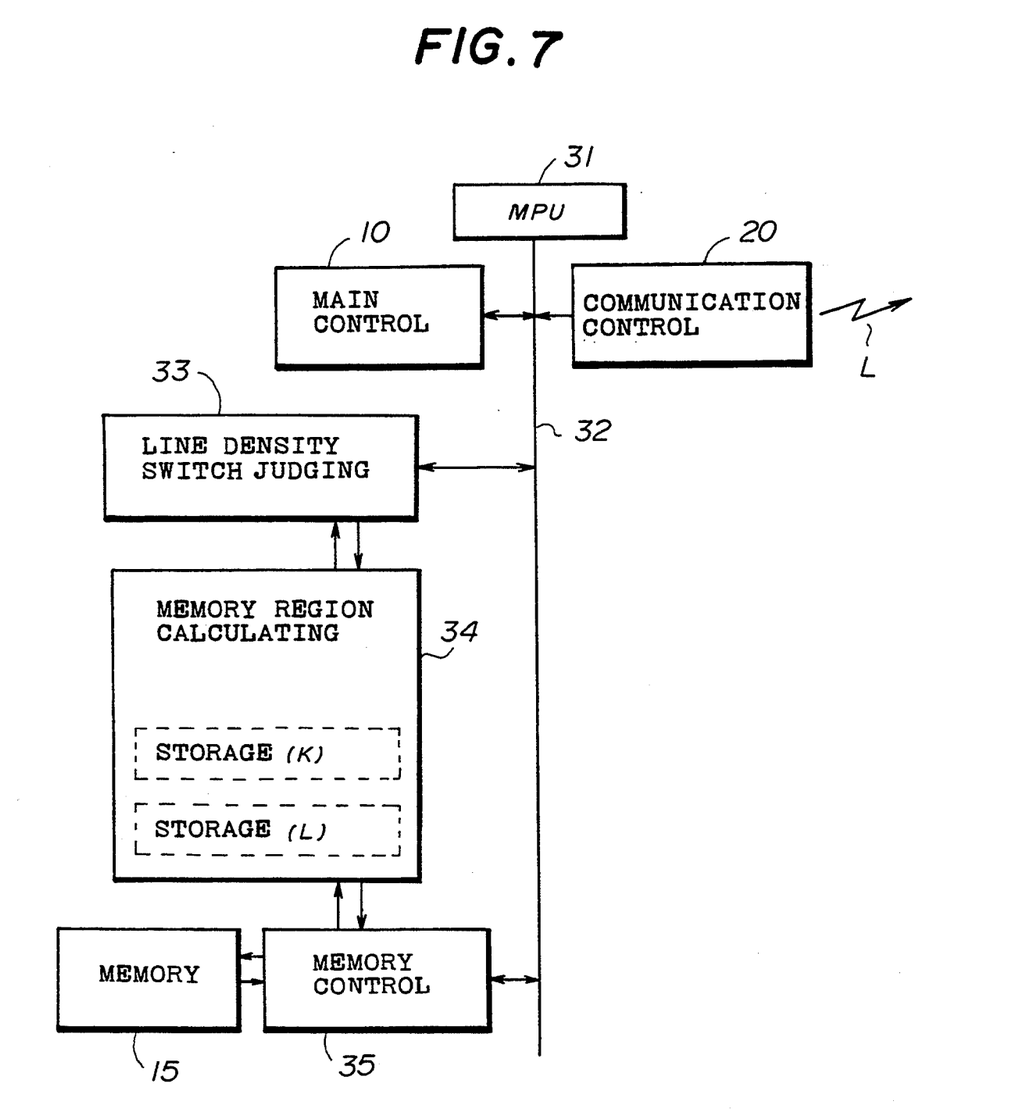
FIG. 7 is a system block diagram showing a second embodiment of the facsimile machine according to the present invention.
Figure 8:
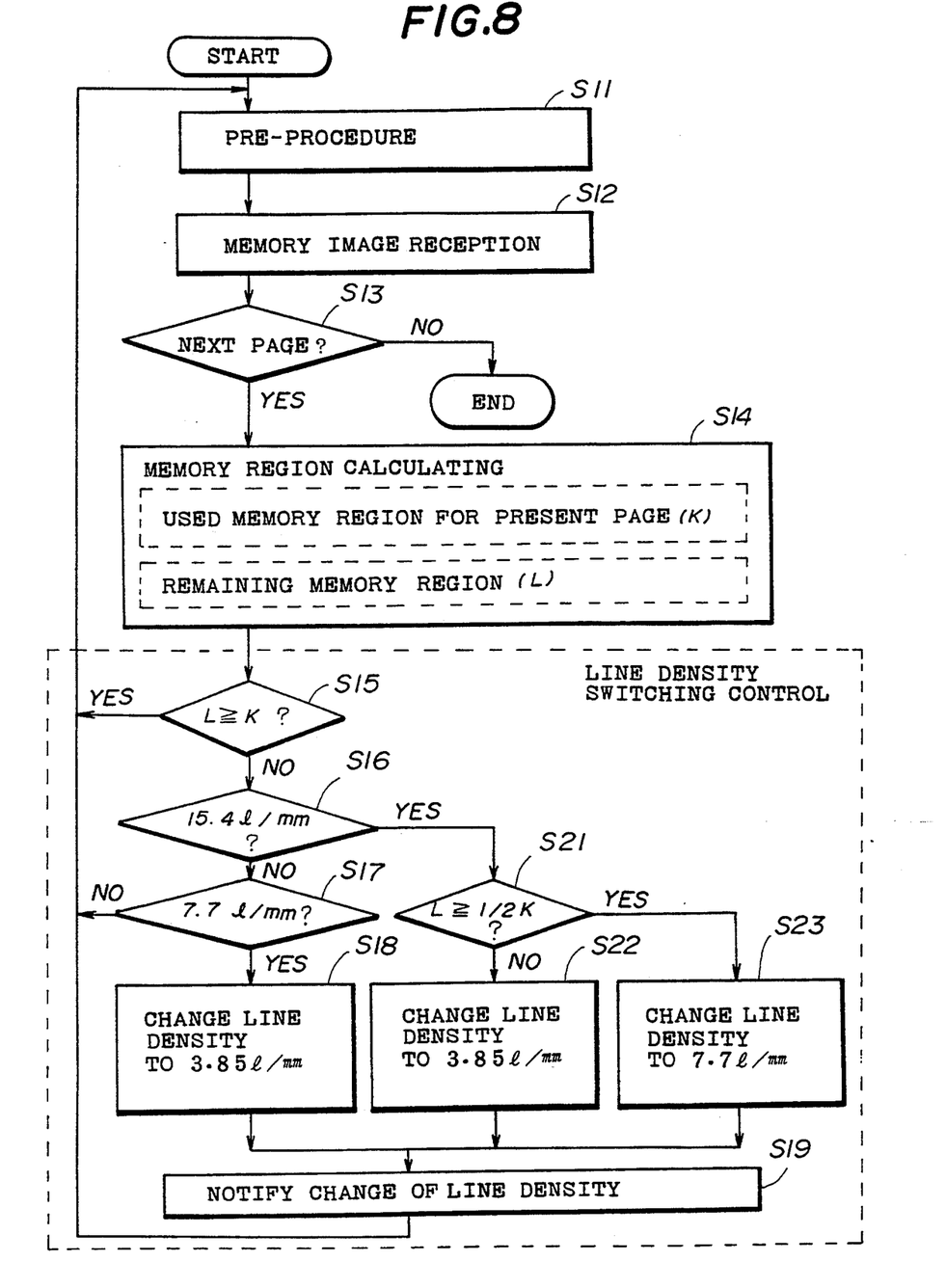
FIG. 8 is a flow chart for explaining the operation of the second embodiment.

Next, a description will be given of a second embodiment of the facsimile machine according to the present invention. FIG. 7 shows an essential part of the second embodiment, and FIG. 8 is a flow chart for explaining the operation. In FIG. 7, those parts which are the same as those corresponding parts in FIG. 3 are designated by the same reference numerals, and a description thereof will be omitted.

In FIG. 7, the main control part 10, the communication control part 20, a line density switch judging part 33 and a memory control part 35 are coupled to a bus 32 of an MPU 31. The memory 15 is coupled to a bus 32 via the memory control part 35, and a memory region calculating part 34 is coupled between the line density switch judging part 33 and the memory control part 35.

At the time of the memory reception, the main control part 10 at the receiving side stores the data which is received through the line L under control of the communication control part 20 into the memory 15 by the memory control part 35. When the reception of data amounting to one page ends, the main control part 10 requests the line density switch judging part 33 to judge whether or not the switching of the line density is to be made for the next page. The line density switch judging part 33 requests the memory region calculating part 34 to calculate the memory region.

The memory region calculating part 34 calculates a used memory region K of the memory 15 which is used to store the data up to the present page and a remaining memory region L within the memory 15, based on start and end addresses of the memory region of the memory 15 and the end address of the data which is already stored. These addresses are obtained from the memory control part 35. The memory regions K and L are respectively stored in storage parts (K) and (L) within the memory region calculating part 34. If $L<K$, it is possible that the remaining memory region may become zero during the reception of the next page. Hence, the line density switch judging part 33 makes access to the storage parts (K) and (L) within the memory region calculating part 34 and instructs the main control part 10 to switch the line density if $L<K$. As a result, the main control part 10 switches the line density with respect to the communication control part 20.

On the other hand, the communication control part 20 changes the line density in the procedure. In other words, the communication control part 20 makes the capability notification to the transmitting side, wherein the capability notification is based on the line density after the change for the second time. If the memory capacity required by the next page is denoted by M for the case where the line density is 15.4 lines/mm, the memory capacity used in the memory 15 becomes ½(m) if the line density is changed to 7.7 lines/mm, and the memory capacity is changed to ¼ if the line density is changed to 3.85 lines/mm.

A more detailed description will be given of the operation of the second embodiment, by referring to FIG. 8. A step S11 carries out the pre-procedure described above, and a step S12 starts the memory reception. A step S13 detects whether or not the next page exists, and the process ends if the decision result in the step S13 is NO. On the other hand, if the decision result in the step S13 is YES, a step S14 calculates the used memory region K and the remaining memory region L.

A step S15 decides whether or not $L \geq K$. If $L<K$ and the decision result in the step S15 is NO, the possibility of the remaining memory region L becoming zero during the reception of the next page with the present line density is high, and the line density is thus changed. A step S16 determines whether or not the line density is 15.4 lines/mm, and a step S17 decides whether or not the line density is 7.7 lines/mm if the decision result in the step S16 is NO. If the decision result in the step S17 is YES, a step S18 changes the line density to 3.85 lines/mm, and a step S19 notifies this change in line density to the communication control part 20.

If the decision result in the step S15 is YES, the process returns to the step S11 if the decision result in the step S17 is NO or after the step S19.

When the decision result in the step S16 is YES, a step S21 decides whether or not $L \geq K/2$. If the decision result in the step S21 is NO, a step S22 changes the line density to 3.85 lines/mm and the process advances to the step S19. On the other hand, if the decision result in the step S21 is YES, a step S23 changes the line density to 7.7 lines/mm and the process advances to the step S19.

According to this embodiment, the line density is changed in steps, and the reception can be made with the highest possible line density.

Further, the present invention is not limited to these embodiments, but various variations and modifications may be made without departing from the scope of the present invention.

INDUSTRIAL APPLICABILITY

As described above, according to the facsimile machine of the present invention, the capability notification automatically transmitted and the line density is switched to a value lower than from the initial line density when the remaining memory region becomes small and the possibility of the remaining memory region becoming zero during the memory reception becomes high. Generally, the transmission is made with a high density from the transmitting side, and the image data quantity is large. For this reason, when the present invention is applied to a facsimile machine which frequently makes automatic receptions at night when no person can attend the machine and when memory receptions are frequently made because of the relatively small amount of paper that the machine can accommodate. Thus, it is possible to minimize the possibility of the remaining memory region becoming zero during the memory reception such that and the image data from the transmitting side can be received by the memory reception while minimizing the possibility of data loss, making the machine extremely practical and useful. Of course, if the transmitting side transmits with the low line density from the start, the picture quality becomes unnecessarily poor and this is undesirable.

We claim:

1. A facsimile machine or receiving image data in any of a plurality of line densities, the image data being transmitted from a transmitting facsimile machine which sends the image data in a selected one of the plurality of line densities, the facsimile machine having a memory reception mode in which the image data is received from the transmitting facsimile machine during an automatic reception and is stored, comprising:

control means for sending an initial capability notification to the transmitting facsimile machine in a pre-procedure during the automatic reception, said control means receiving an initial specification of line density from the transmitting facsimile machine so that the receiving facsimile machine receives the image data at the specified line density;

memory means for storing the received image data;

detecting means coupled to said memory means for detecting a remaining memory region which is usable within said memory means during data transmission; and line density switching means for providing an instruction to said control means for switching of the line density during data transmission if the remaining memory region detected by said detecting means is less than or equal to a predetermined region;

said control means automatically transmitting a second capability notification to the transmitting facsimile machine in response to said instruction from said line density switching means so as to receive the image data from the transmitting facsimile machine with a line density which is lower than the specified line density when the automatic reception was started.

2. The facsimile machine as claimed in claim 1, wherein the detecting means calculates the remaining memory region based on start and end addresses of a memory space of the memory means and an end address of the image data already stored in the memory means.

3. The facsimile machine as claimed in claim 1, wherein the detecting means calculates and stores a used memory region K of the memory means which is already used and calculates a remaining memory region L of the memory means such that if $L<K$, the line density switching means outputs the instruction to switch the line density.

4. The facsimile machine as claimed in claim 1, wherein the line density switching means instructs the switching of the line density to a minimum line density when the remaining memory region is less than or equal to the predetermined region.

5. The facsimile machine as claimed in claim 1 wherein the line density switching means outputs the instruction to reduce the line density in steps depending on the remaining memory region when the remaining memory region is less than or equal to the predetermined region.

* * * * *

UNITED STATES PATENT AND TRADEMARK OFFICE
CERTIFICATE OF CORRECTION

PATENT NO. : 5,359,429
DATED : October 25, 1994
INVENTOR(S) : Yoshiaki Takahashi It is certified that error appears in the above-indentified patent and that said Letters Patent is hereby corrected as shown below:

In column 3, line 28, after "can" insert --attend--.

In column 4, line 18, delete "again" and insert --again,--.

In column 6, line 27, delete "(m)" and insert --(M)--.

In column 7, line 8, delete "than".

In column 7, line 23, after "that" delete "and".

In column 7, line 31, delete "or" and insert --for--.

Signed and Sealed this

Eighteenth Day of April, 1995

Attest:

BRUCE LEHMAN

Attesting Officer

Commissioner of Patents and Trademarks